United States Patent [19]

Johnson et al.

[11] E Re. 29,725

[45] Reissued Aug. 8, 1978

[54] ANALYTICAL TEST PACK AND PROCESS FOR ANALYSIS

[75] Inventors: Donald R. Johnson, Wilmington; Richard G. Nadeau; Gerrit Nieuweboer, both of Claymont, all of Del.; William L. Truett, Blackwood, N.J.

[73] Assignee: E. I. du Pont de Nemours and Company, Wilmington, Del.

[21] Appl. No.: 35,438

[22] Filed: May 7, 1970

Related U.S. Patent Documents

Reissue of:

[64] Patent No.: 3,476,515
Issued: Nov. 4, 1969
Appl. No.: 545,494
Filed: Apr. 26, 1966

[51] Int. Cl.[2] ..... G01N 33/16; G01N 21/24

[52] U.S. Cl. ..... 23/230 R; 23/230 B; 23/253 R; 206/219; 206/459; 356/180; 356/246

[58] Field of Search ..... 23/230 B, 230 R, 253 R, 23/259; 356/246, 180; 206/219, 459, 498

[56] References Cited

U.S. PATENT DOCUMENTS

| | | | |
|---|---|---|---|
| 2,709,127 | 5/1955 | Grosskopf | 23/230 R |
| 2,940,448 | 6/1960 | Furlong | 128/276 |
| 3,036,894 | 5/1962 | Forestiere | 23/253 TP |
| 3,068,855 | 12/1962 | Furlong | 128/2 |
| 3,233,975 | 2/1966 | McCormick | 23/259 |
| 3,278,014 | 10/1966 | Thornton | 426/86 |
| 3,326,363 | 6/1967 | Bennett et al. | 220/23 |

*Primary Examiner*—R.E. Serwin

[57] ABSTRACT

Performing analytical tests more easily, quickly and accurately by using a specially designed pouch-like container of pliable material. The container has within it a plurality of compartments, each compartment being capable of containing a different reagent and each compartment also being capable of releasing its contained reagent, independently of any other reagents present in the other compartments, into the area of the container not occupied by compartments. This latter area of the container is also adapted to receive the test sample for reaction with any single reagent or any combination of reagents released from the compartments.

35 Claims, 8 Drawing Figures

ANALYTICAL TEST PACK AND PROCESS FOR ANALYSIS

Matter enclosed in heavy brackets [ ] appears in the original patent but forms no part of this reissue specification; matter printed in italics indicates the additions made by reissue.

This invention relates to novel testing containers, processes for making them, and the processes of using such containers to carry out analytical procedures.

Among the many problems facing the biomedical field is the lack of assurance that the results of analytical tests are error-free. Although these analytical tests are extremely important, and critical decisions relating to patient treatment must be based upon the results of such tests, the procedures leave much to be desired from the standpoint of being free of operator errors. The procedures are usually repetitive, routine, time-consuming and dull. Hence, they are usually performed by technicians whose slight errors in weighing reagents, in mixing reactants, in timing the reactions, etc., can and sometimes do produce disastrous results.

The object of this invention is to provide the means for performing analytical tests more easily, more quickly and accurately even by those without any significant technical training while minimizing the possibility of operator errors. Other objects will appear hereinafter.

Although the invention will be described primarily for its application in the biomedical field, the invention is useful for the performance of a variety of chemical and biological tests. Thus, the subject matter of the invention will find use in pharmaceutical laboratories, agricultural laboratories, etc., as well as in general chemical and biological laboratories.

The objects are accomplished by providing an analytical test pack composed of a pouch-like container of flexible (pliable) polymeric material, preferably of transparent or transluscent, thermoplastic material, the container being divided into, or containing a plurality of small compartments or chambers; the plurality of small compartments occupying less than the total volume of the container to leave a reaction chamber, the small compartments being adapted to be charged with predetermined amounts of testing reagents and each adapted further to be capable of releasing these reagents independently into the reaction chamber, usually upon the exertion of suitable energy, e.g., pressure; and means communicating with the reaction chamber for introducing the material to be tested, the test sample, into the reaction chamber, the introducing means being adapted to prevent backflow of the test sample after its introduction into the reaction chamber.

In the broadest sense, one process for preparing the analytical test pack comprises forming at least one depression or recess, preferably a plurality of depressions or recesses, in a substantially flat sheet of a polymeric film, the depressions occupying less than the total area of the sheet; placing premeasured quantities of reagents in the depressions; placing a second sheet usually having substantially the same dimensions as the first sheet over the first sheet, the second sheet preferably being heat sealable to the first sheet; bonding the second sheet to the first sheet substantially along the outer periphery of the sheets to provide a reaction chamber between the sheets; bonding the two sheets to one another around the depression(s) to fix the location of the reagent(s) in a manner such that the bonded areas are rupturable so that they may be unbonded upon the exertion of suitable force to release the reagents from the depressions into the reaction chamber. It should be understood that the means for introducing the material to be treated into the reaction chamber is preferably built into the test pack as will be shown in the subsequent description. However, it is possible to use a hypodermic needle inserted carefully into the wall to introduce the material to be tested and to reseal the point of insertion after withdrawing the needle.

The process of using the analytical test pack involves employing premeasured quantities of the analytical reagents in the various recesses, bonding the areas around the reagents and introducing the sample to be analyzed through an inlet into the reaction chamber; applying pressure to at least one sheet in the area adjacent to at least one reagent to rupture the bonded area around the reagent to release the reagent from the recess into the reaction chamber; mixing the reagent by pulsating the sheets encompassing the reaction chamber and reading out the result of the reaction between the reagent and the test sample.

"Reading out" may be accomplished by measuring the spectral characteristics with an appropriate photometer, e.g., spectrophotometer, fluorimeter, etc., or measuring the thermal properties, the chemical properties, the physical properties, or the electrical or electrochemical properties, e.g., dielectric constant, conductivity, diffusion current, or electrochemical potential etc. It should be understood that, where appropriate, the sensors for certain measurements can be incorporated in the test pack during construction. For example, electrodes for conductivity or electrochemical measurements, thermocouples or thermistors for thermal measurements, etc., can be incorporated in the test pack during construction. "Reading out" is preferably accomplished by forming the reaction chamber into a suitable optical cell and measuring spectral characteristics.

In using the test pack, advantage may be taken of differential measurement techniques. This may be accomplished by dividing the reaction chamber into two portions by sealing it accordingly and subjecting the two portions to different conditions. "Read out" is then accomplished by determining any of the above properties in a differential manner.

The test packs, their preparation and their use in analysis will be more clearly understood by referring to the drawings and the description that follows.

PREPARATION OF TEST PACK

Figure 1:
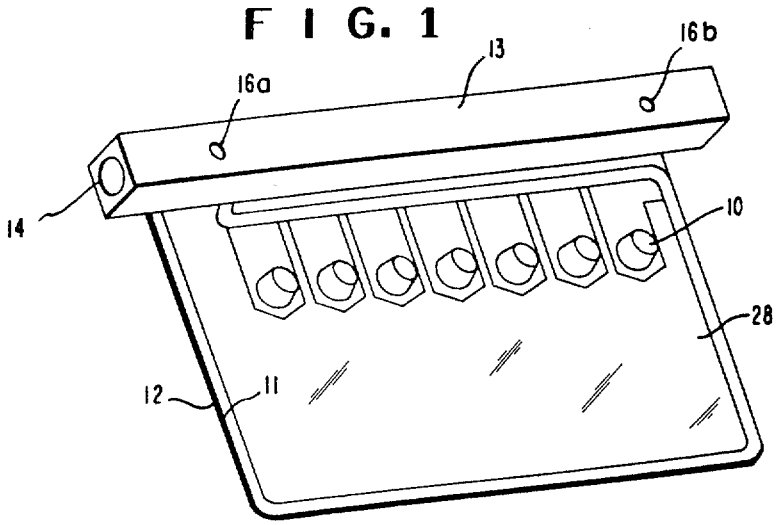
FIG. 1 is a view, in perspective, of one embodiment of an analytical test pack of this invention.
Figure 1A:
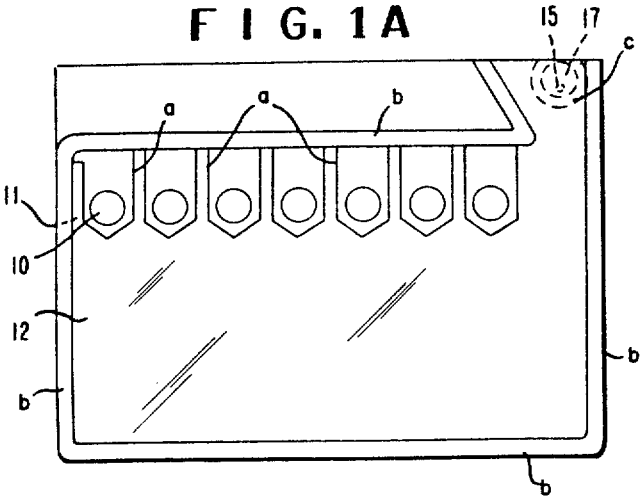
FIGS. 1A–1C depict the steps in forming the test pack illustrated in FIG. 1.

The preferred test pack is shown in FIG. 1. Reference is made first to FIG. 1A in describing its preparation. The first step involves forming a plurality of circular depressions or recesses 10 in substantially side-by-side relationship in a base sheet of impervious pliable or flexible polymeric material 11. The sheet is preferably transparent, thermoplastic and selected from any of the following materials; polymers of olefins, e.g., ethylene, propylene and copolymers with vinyl acetate, etc., halogenated polymers, e.g., polymers of vinyl chloride, vinylidene chloride and copolymers with vinyl acetate, rubber hydrochloride, vinyl fluoride polymers, etc., polyesters, e.g., polyethylene terephthalate, ionomer resins, etc. or laminates thereof or laminates with metal foils. Preferred materials are disclosed in U.S. Patent application Ser. No. 271,477, filed Apr. 8, 1963 to R. W. Rees, now U.S. Pat. No. 3,264,272. They are the ionic copolymers of alpha-olefins (ethylene) and alpha, beta-ethylenicaly unsaturated carboxylic acids of 3–8 carbon atoms having 10–90% of the carboxylic acid groups ionized by being neutralized with metal ions. The size of the sheet may be anywhere from 1 inch × 1 inch, 3 inch × 4 inch, etc. to any conveniently handled size. The recesses 10 are most easily formed by bringing an appropriate die, heated or otherwise, into contact with the base sheet and applying pressure. It should be understood that vacuum forming may also be used for forming the recesses.

The next step involves placing solid or liquid reagents in the recesses 10. The simplest procedure is to place tablets in the recesses. The reagents may also be added as liquids followed by freeze-drying, if desired, in situ. Specific representative materials for specific analytical tests will be disclosed in the subsequent examples.

After the reagents have been placed in the recesses, a second sheet 12 corresponding to the first or base sheet in size and usually in composition is placed over the first sheet. Heat and pressure are then applied to the areas a surrounding the pods of reagent with a conventional heat sealing die or using an impulse heat sealer. However, the bonded or sealed areas are relatively narrow and/or the heat input is controlled carefully to avoid permanently sealing these areas. Specifically, the temperature, pressure, and dwell time may be controlled to provide seals that can be later ruptured by the application of pressure to liquid in the chamber between the two sheets exterior to the recesses, the liquid serving to peel the seals hydraulically. Alternatively, adhesives or other forms of bonding may be used, provided that rupturable bonds, as disclosed previously, are formed in these areas. Heat and pressure are then applied to area b to provide permanent bonding at the peripheries of sheets 11 and 12 and to form a reaction chamber 28 between them. It will be noted that a small area c at one edge is left unbonded.

Figure 1B:
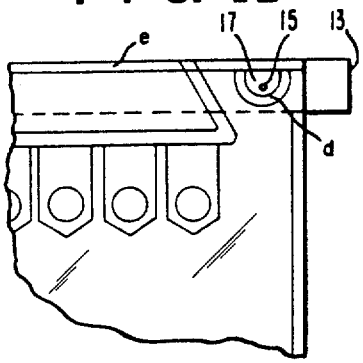

The rigid header 13 having a substantially cylindrical channel 14 disposed laterally therein and a single small opening 15 from one side of the header communicating with the channel, is then placed under the base sheet 11 in a manner shown in FIG. 1B such that the opening 15 is directly beneath the opening 17 in the base sheet 11. Two additional openings, 16a and 16b, will be noted on the face of header 13 opposite to the face in which opening 15 is located. This face of the header may also carry information for identifying and using the test pack.

Heat and pressure are then applied to the sheet 11 and the header 13 in the area d to bond the base sheet 11 to the header around the opening 17. After this step, heat and pressure are applied along area e across the upper edges of the two sheets and the header to bond the sheets to the header 13 and to form the test pack shown in FIG. 1. It will be noted that the test pack has been reversed in FIG. 1 so that the header 13 and the base sheet 11 are over sheet 12.

Figure 1C:
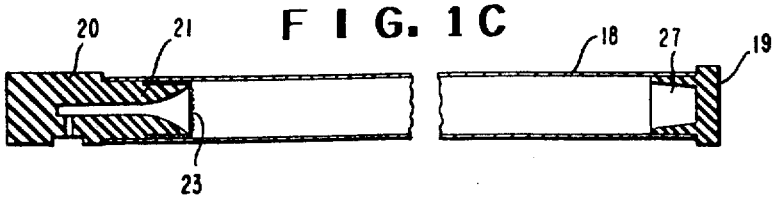

To complete the test pack, the cartridge shown in FIG. 1C is inserted into the channel 14. The cartridge is composed of a length of relatively stiff polymeric tubing (preferably of polypropylene) 18; a stopper 19, usually of rubber, designed to provide free area shown at 27; and a combined stopper and valve 20. The stopper valve 20 is designed with a passage 21 to provide communication from within the tube 18 through the passage 21 and through the opening 15 in the header 13 and the opening 17 in the base sheet 11 into the reaction chamber between the sheets 11 and 12. A partition 23 separates the channel 21 from the interior of the tube 18. When the partition 23 is made of an impervious material, liquid may be delivered into the reaction chamber by injecting it into channel 21 and thence through the passage previously described by inserting an appropriate injection means such as a hypodermic needle through opening 16a in the header 13. When the partition is made of a porous material such as a screen or filter, liquid may be delivered into the reaction chamber through the interior of the tube 18 and the channel 21 and thence through the passage previously described by inserting an appropriate injection means such as a hypodermic needle into the free area 27 of stopper 19 through oepning 16b in the header 13. In either case, after the delivery of liquid into the reaction chamber is complete, the stopper-cartridge assembly is moved to the right a sufficient amount to close the opening 15 to prevent backflow of the test sample.

The advantages of the cartridge are readily apparent. Besides providing an efficient and accurate means for delivering liquid, e.g., the liquid sample, into the test pack, the cartridge provides an area for the possible location of analytical aids. Thus, an ion exchange resin can be placed within the tube 18 so that the ions can be removed or the pH of a sample can be altered as the sample flows through the tube and into the chamber. A filter bed, a filter screen, or a gel filtration material, e.g., "Sephadex" dextran gel, "Biogel" polyacrylamide gel, etc., can also be placed within the tube. Alternatively, combinations of the above with or without other analytical aids, mixed or in sequence, may be included in the tube 18.

Figure 2:
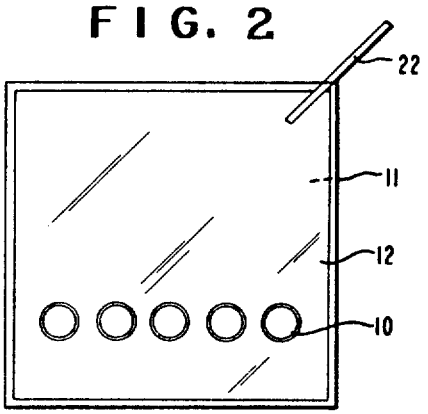
FIGS. 2–4 are other embodiments of test packs that utilize the principles of this invention.
Figure 3:
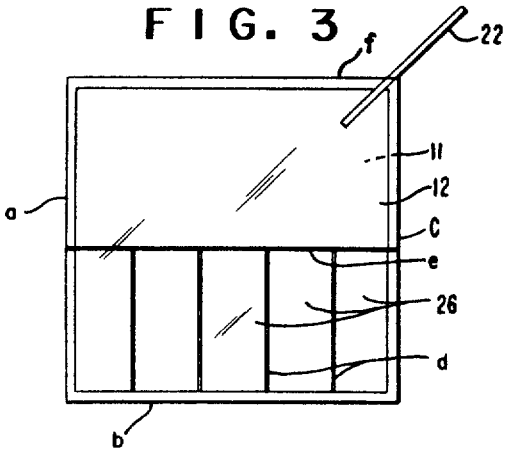
Figure 4:
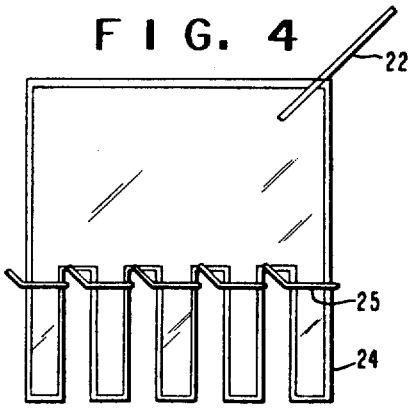

FIGS. 2, 3, and 4 represent less preferred embodiments of the analytical test pack of the invention. Instead of using a header as the means for providing the inlet to the reaction chamber, these embodiments utilize a flexible tube 22 conjointly sealed with the two sheets forming the container to provide a resealable inlet. Specifically, in FIG. 2, a plurality of depressions 10 are formed in at least one of the sheets 11. The reagents are placed in the depressions. The flexible tube 22, usually of the same material as the sheets, is placed so that it intersects one edge of the sheet. Sheet 12 is then placed over sheet 11 and the sheets are joined along the edge by heat sealing or adhesion without sealing the opening in the tube 22. This may be accomplished by placing a rigid wire or rod within the opening during heat sealing and removing it after sealing. The area surrounding the depressions 10 in sheet 11 are also joined to sheet 12 to isolate each reagent. Heat sealing is preferred for this purpose, although any method may be used to provide a seal that will prevent release of the reagent until the seals are subsequently ruptured.

In FIG. 3, two sheets 11 and 12 are joined along three edge areas a, b, and c by heat sealing or adhesion. They are also joined along the longitudinal areas represented by d. After the reagents are placed in the spaces 26, they are sealed in by a breakable seal along the area represented by e. The flexible tube 22 is then placed between the two sheets 11 and 12 so as to intersect the unjoined edge f. Thereafter, the sheets are joined along this last mentioned edge, the process of joining also serving to preserve the opening in the tube 22 as described with reference to FIG. 2.

The container shown in FIG. 4 employs separate lengths 24 of the container in which to place the reagents. For this embodiment, breakable seals or clips 25 can be used to prevent release of the reagents until desired. In all other respects, this container may be prepared substantially as the container of FIG. 3.

PROCESS OF USING THE TEST PACK

Figure 5:
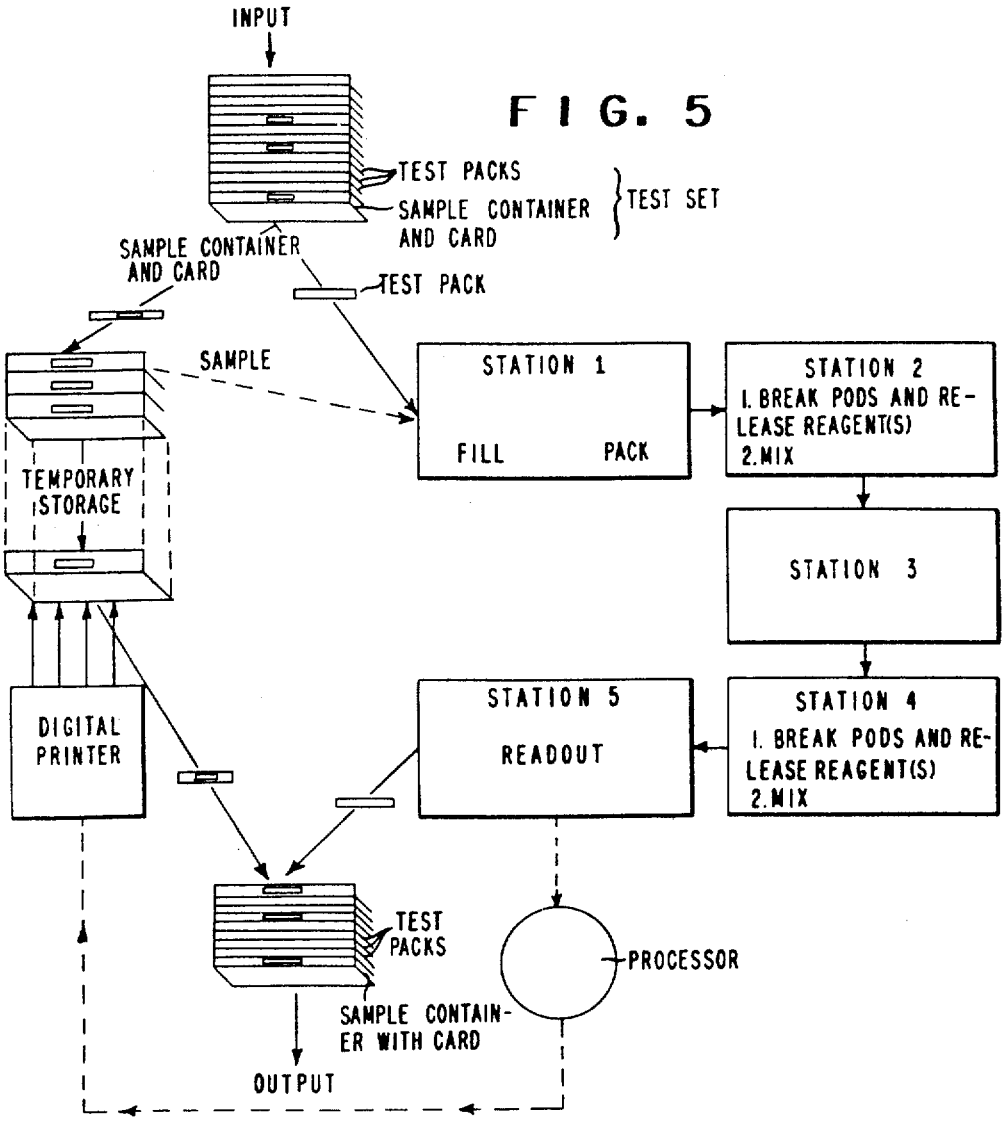
FIG. 5 is a schematic illustration of an automatic apparatus that uses the preferred analytical test pack.

A process for using the preferred analytical test pack is shown in FIG. 5. A series of sample containers are affixed to cards at the input; a test pack for each analysis to be performed on the sample is placed with the container; and the test set (the sample container and test packs) is routed accordingly.

At station 1, a measured quantity of the sample is introduced into the reaction chamber of the test pack. Optionally, a diluent may also be added at this point. This step is most easily performed by using a hypodermic needle to withdraw sample from a sample cup and to inject it into the cartridge of the pack shown in FIG. 1. This can be done manually or mechanically. If the sample is suitable for analysis as received, it is injected into channel 21 through the opening 16a in the header 13, and thence into the reaction chamber as previously described. If the sample requires preliminary treatment, e.g., filtration, removal of interfering substances, etc., it is injected into the free area within stopper 19, through opening 16b. The sample then passes through a suitably filled interior of tube 18, the partition 23 and channel 21 before passing into the reaction chamber.

At station 2, a selected pod or pods containing reagents for the analysis are released into the reaction chamber and mixed with its contents. Manually, this can be done by applying suitable force to open the "breakable" seals and, thus to release the reagents into the reaction chamber. In a mechanical operation, this is most easily done by first protecting those pods which are not to be opened with a ring of metal or other rigid material. A flat metal surface behind the pods and a metal surface containing recesses to enclose the pods to be protected represent the simplest device. Thereafter, by applying pressure to the remainder of the bag, the hydraulic force of the liquid in the pack can be used to open the "breakable" seals around the unprotected pods. In this manner, the reagents are released into the reaction chamber. By the application and release of a light, pulsing force on the liquid, the reagents are mixed thoroughly with the contents of the reaction chamber.

Station 3 may be used if a waiting period is necessary before releasing one or more additional reagents at station 4. Station 3 may also be used to provide time for obtaining a blank reaction based on the activities at station 2 before proceding to station 4. Since station 4 is substantially identical to station 2, either of these stations may be used if only one addition of reagent(s) is contemplated. The choice of station depends upon whether a delay at station 3 is desired prior or subsequent to the single addition.

Station 5 is the readout station. If the result is to be read out photometrically, then means are provided to clamp the pack in a position where electromagnetic radiation, e.g., visible, ultraviolet, or infrared can be directed through the contents of the reaction chamber and the transmitted radiation can be directed on to an appropriate detector. The measurement obtained usually provides the absorption or rate of change of absorption of the contents of the chamber. Optionally, the signal from the detector can be amplified and processed with the result being printed on the card affixed to the original sample container at the "digital printer" location. Thereafter, the card and the spent test pack(s) are fed as a test set to the output station.

The process of using the test pack provides many advantages. For example, any test or tests for which test packs are available may be performed in any order or at any time by relatively unskilled personnel without modifying the experimental apparatus. Reagents and other materials can be kept in their most stable form until immediately before use and little or no operator effort is required to prepare them for use. Materials and methods can be made uniform and can be controlled for optimum performance to insure accuracy of the test irrespective of the operator or the location. Positive identification of the sample and the test can be provided on the print-out device to further minimize the opportunity for operator error. New and sophisticated tests may be performed with a minimum of operator training. Since the test packs are disposable, there is no investment in glassware nor is there any necessity for cleaning. The possibility of contaminating the reagents or the test equipment is minimized. It will also be apparent that the waste of expensive reagents incurred when usual laboratory batches are incompletely used is minimized.

Additional advantages will be apparent from the following examples illustrating the utility of the invention. These examples, being merely illustrative, should not be considered to limit the scope of the invention.

EXAMPLE 1

In this example, the testing procedure for determining blood urea nitrogen as described in U.S. patent application Ser. No. 502,596 filed Oct. 22, 1965 to R. G. Nadeau, may be performed.

A measured amount of l-cysteine hydrochloride (1.575 milligrams) is placed in compartment No. 1 of the test pack illustrated in FIG. 1. Measured amounts of the monosodium salt of alpha-ketoglutaric acid (3.54 milligrams) and the disodium salt of dihydro-beta-diphosphopyridinenucleotide (1.01 milligrams) are placed in compartment No. 2 of the test pack. A measured amount (4.5 units) of alpha-glutamic dehydrogenase in 50% glycerol is placed in compartment No. 3. A measured amount (0.5 unit) of urease is placed in compartment No. 4.

The test sample of blood serum is first introduced into the chamber by injection into channel 21 of the header of the test pack of FIG. 1 as described on page 8. A phosphate buffer is then introduced into the reaction chamber. Pressure is applied to rupture the seals surrounding compartments Nos. 1, 2, and 3 to release their contents and mix them with the test sample. After a suitable delay, the seal surrounding compartment No. 4 is ruptured to release urease and the results are "read out" as described in Ser. No. 502,596 by determining absorbance or rate of change of absorbance using light at 340 millimicrons to provide the concentration of urea in the test sample.

EXAMPLE 2

In this example, a test pack similar to that shown in FIG. 1 is used, the pack containing only four reagent compartments. In the first reagent compartment is placed 10.0 milligrams of beta-nicotinamide adenine dinucleotide disodium salt (oxidized form), 0.25 milligram of phenazine methosulfate, and 0.2 milligram of 2,6-dichlorophenol indophenol. The second, third and fourth compartments contain measured amounts of 1-lactic acid, 1-malic acid and alpha-hydroxybutyric acid, respectively. The main reaction chamber contains a liquid buffer composition of sodium hydrogen phosphate.

An exact quantity of blood serum is introduced into the reaction chamber by injection into channel 21 of the header of the test pack of FIG. 1 as described on page 8. A phosphate buffer as a diluent is then injected into channel 21 and fed into the reaction chamber. The seal surrounding the first reagent compartment is ruptured to release the nicotinamide adenine dinucleotide, phenazine methosulfate and dichlorophenol indophenol. These reagents are mixed with the serum and the buffer solution in the main reaction chamber by applying pressure in a pulsating manner to the chamber. Thereafter, depending upon which of three dehydrogenase determinations (lactic acid dehydrogenase, malic acid dehydrogenase or alpha-hydroxybutyric acid dehydrogenase) is desired, the seal around one of the remaining three reagent compartments is ruptured.

The contents are mixed with the solution in the reaction chamber by again applying a pulsating pressure and the result is "read out" in a manner similar to that described in Ser. No. 502,596 by determining absorbance or change in absorbance using light at 610 millimicrons to provide the concentration of the particular dehydrogenase. Alternatively, the main reaction chamber and its contents may be divided into two sections by the application of an impulse sealer. One section may be heated to about 37° C. while the other section may be cooled to 5° C. After a suitable period, the two sections may then be read differentially using a spectrophotometer. The concentration of the particular enzyme in the test sample is determined from the differential absorbance measurement.

EXAMPLE 3

This example describes a testing procedure for determining glucose.

A measured amount of 3,3′ dimethoxybenzidine dihydrochloride (0.25 milligram) is placed in compartment No. 1 of the test pack illustrated in FIG. 1. A measured amount of peroxidase (0.01 milligram or 1.1 units) is placed in compartment No. 2 of the test pack. Lastly, a measured amount of glucose oxidase (0.125 milligram or 16.25 units) is placed in compartment No. 3.

A test sample of blood serum, or other fluid in which glucose is present, is introduced into the chamber. A phosphate buffer is then introduced into the reaction chamber as in Example 2. A force is applied to rupture the seals surrounding compartments Nos. 1 and 2 to release the reagents and mix them with the contents of the reaction chamber. After thorough mixing, the seal surrounding compartment No. 3 is ruptured to release the glucose oxidase and the results are "read out" as in Example 1 by determining the absorbance or rate of change of absorbance using light as 437 millimicrons.

EXAMPLE 4

This example describes a procedure for examining a test sample to determine its glutamic-oxalacetic transaminase or glutamic-pyruvic transaminase activity. For this example it is necessary to separate the active enzyme fraction from the protein-free fraction of the blood serum test sample. This separation may be accomplished within the test pack shown in FIG. 1 by using a cartridge containing a gel filtration material. Specifically, cartridge 18 of FIG. 1 is loaded with 1.5 milliliter of hydrated polyacrylamide gel[1]. The test sample is injected into the area 27 in stopper 19 and thence through the gel in the cartridge as described on page 9. Thereafter, a phosphate buffer is forced through the gel filtration material containing the test sample in the same manner. The first effluent containing the active enzyme is then channelled into the reaction chamber of the test pack. After separation has been accomplished, an additional amount of the phosphate buffer is injected through channel 21 into the main reaction chamber of the test pack.

[1]"Bio-Gel P-4" manufactured by Bio-Rad Corporation, Los Angeles, California

In this analytical test pack, five compartments for reagents are used. Compartment No. 1 is charged with 10.0 milligrams of beta-nicotinamide adenine dinucleotide disodium salt (oxidized form), 0.25 milligram of phenazine methosulfate, and 0.2 milligram of 2,6-dichlorophenol indophenol. In compartment No. 2 there are 75 microliters of 1-glutamic dehydrogenase solution (100 micro-molar units/milliliter). Cpmpartment No. 3 contains 1.35 milligram of alpha keto-glutaric acid. Compartments Nos. 4 and 5 contain 30 milligrams of 1-aspartic acid and 25 milligrams of 1-alanine, respectively. The reagent compartments are charged with predetermined, but non-rate limiting, amounts of each compound.

Reagent compartments Nos. 1, 2, and 3 are ruptured and their contents mixed with the main reaction chamber solution in the manner disclosed in the previous examples. Depending on which transaminase assay is desired, either compartment No. 4 or compartment No. 5 is ruptured and its contents mixed with the main reaction chamber solution.

The contents are mixed with the solution in the reaction chamber by again applying a pulsating pressure and the result is "read out" in a manner similar to that described in Ser. No. 502,596 by determining absorbance or change in absorbance using light at 610 millimicrons to provide the concentration of the particular dehydrogenase. Alternatively, the main reaction chamber and its contents may be divided into two sections by the application of an impulse sealer. One section may be heated to about 37° C. while the other section may be cooled to 5° C. After a suitable period, the two sections may then be read differentially using a spectrophotometer. The concentration of the particular enzyme in the test sample is determined from the differential absorbance measurement.

What is claimed is:

1. An analytical test pack consisting essentially of a pouch-like container of pliable material; said container having a plurality of compartments, the compartments occupying less than the total volume of said container to leave a reaction chamber, the compartments being adapted to be charged with predetermined quantities of testing reagents and each compartment being further adapted to release said reagents independently of any other reagents present in the other compartments into the reaction chamber; and means communicating with said reaction chamber for introducing the test sample into said reaction chamber, said means being adapted to prevent backflow of said test sample after its introduction into the reaction chamber.

2. An analytical test pack as in claim 1 wherein information for identifying and for processing said pack are affixed to said pack.

3. An analytical test pack composed of two opposed layers of pliable polymeric material of substantially equal dimensions; the first of said layers having at least one recess therein, said recess occupying less than the total area of first first layer; a predetermined amount of analytical reagent in said recess; the second layer bonded to said first layer in the area about said recess, the bonded area being adapted to be ruptured sufficiently to release reagent from said recess independently of any other reagent present in any other recess upon the application of pressure into the space between said two opposed layers not occupied by said recess; means communicating with the space between said two opposed layers not occupied by said recess for introducing the material to be tested into the said space; the second layer being further bonded to said first layer in an area remote from said recess, the further bonded area being substantially permanent, to provide an enclosed reaction chamber communicating with sid means for introducing the material to be tested.

4. An analytical test pack as in claim 3 wherein said means for introducing the material to be tested comprises a substantially rigid header bonded to at least one of said opposed layers of polymeric material, said header having a substantially cylindrical channel disposed laterally therein and at least one opening, said opening communicating with said channel and with an opening in said layer of polymeric material, said channel adapted to receive a cartridge in snug-fitting relationship, said cartridge having an opening communicating with the opening in the header.

5. An analytical test pack as in claim 3 wherein information for identifying and for processing said pack are affixed to said pack.

6. An analytical test pack composed of two opposed layers of pliable polymeric material of substantially equal dimensions; the first of said layers having a plurality of recesses therein, said recesses occupying less than the total area of said first layer; predetermined amounts of analytical reagents in at least two of said recesses; the second layer bonded to said first layer in areas about each of said recesses, the bonded areas being adapted to be ruptured sufficiently to release said reagents from each of said recesses independently of each other and independently of any reagents in any other recesses upon the application of pressure into the space between said two opposed layers not occupied by said recesses; means communicating with the space between said two opposed layers not occupied by said recesses for introducing the material to be tested into said space; the second layer being further bonded to said first layer in an area remote from said recesses, the further bonded area being substantially permanent, to provide an enclosed reaction chamber communicating with said means for introducing the material to be tested.

7. An analytical test pack as in claim 6 wherein information for identifying and for processing said pack are affixed to said pack.

8. An analytical test pack as in claim 6 wherein said means for introducing the material to be tested comprises a substantially rigid header bonded to at least one of said opposed layers of polymeric material, said header having a substantially cylindrical channel disposed laterally therein and at least one opening, said opening communicating with said channel and with an opening in said layer of polymeric material, said channel adapted to receive a cartridge in snug-fitting relationship, said cartridge having an opening communicating with the opening in the header.

9. An analytical test pack as in claim 8 wherein said cartridge contains means for removing undesirable components from the material to be tested.

10. An analytical test pack as in claim 8 wherein information for identifying and for processing said pack are affixed to said header.

11. A process for preparing an analytical test pack which comrises forming a plurality of depressions in a sheet of polymeric material, said depressions occupying less than the total areas of the sheet; placing premeasured quantities of reagents in at least one of said depressions; placing a second sheet having substantially the same dimensions as the first sheet over the first sheet; bonding the second sheet to the first sheet substantially along the outer periphery of the sheets to provide a reaction chamber between the sheets; bonding the second sheet to the first sheet in areas about each of said reagent-containing depressions, said bonded areas being adapted to be ruptured sufficiently to release said reagents from each of said depressions independently of any other reagents present in the other depressions into the reaction chamber.

12. A process for preparing an analytical test pack which comprises forming a plurality of depressions in a sheet of polymeric material, said depressions occupying less than the total area of the sheet; placing premeasured quantities of reagents in at least one of said depressions; placing a second sheet having substantially the same dimensions as the first sheet over the first sheet; bonding the second sheet to the first sheet in the areas about each of said depressions, said bonded areas being adapted to be ruptured sufficiently to release said reagents from each depression independently of any other reagents present in the other depressions into the remaining space between said sheets; bonding the second sheet to the first sheet substantially along the outer periphery of the sheets; bonding a substantially rigid header to said sheets, said header having an inlet port communicating with an opening in the sheet adjacent to said header; and bonding said header to said sheet adjacent thereto in the area surrounding the opening in said sheet.

13. A method of analyzing a test sample in a reaction chamber provided by the space between two sheets of pliable material bonded together at their outer peripheries, the space between the sheets also containing at least one reagent, each reagent enclosed by an area in which the two sheets are bonded to each other, comprising introducing the test sample into the reaction chamber; applying pressure to at least one of the sheets in an area adjacent at least one of said reagents sufficient to rupture the bonded area enclosing said reagent to release said reagent into said reaction chamber independently of any other reagents in other bonded areas whereby any single reagent or combination of reagents may be released; applying a pulsating pressure to the sheets encompassing the reaction chamber to mix said test sample and said reagent; and reading out the result of the reaction between said reagent and said test sample.

14. A method as in claim 13 wherein said reaction chamber is formed into an analytical cell and the result of the reaction is read out in said cell.

*15. An analytic test pack comprising a container having at least one wall of pliable material; said container having at least two compartments occupying less than the total volume of said container and a reaction chamber, the compartments being adapted to be charged with predetermined quantities of testing reagents and each compartment being further adapted to release said reagents independently of any other reagents present in the other compartments into the reaction chamber; and means communicating with said reaction chamber for introducing a test sample into said reaction chamber.*

*16. The analytic test pack of claim 15 wherein at least a portion of the walls of said reaction chamber are sufficiently optically transparent so that said reaction chamber can be utilized as an optical cell for optical analysis.*

*17. The analytic test pack of claim 15 wherein said reaction chamber comprises at least one compartment and wherein each of said compartments has at least one wall of a pliable polymeric material.*

*18. The analytic test pack of claim 17 wherein at least a portion of the walls of each of said compartments are sufficiently optically transparent so that each of said compartments can be utilized as an optical cell for optical analysis.*

*19. A method of analyzing a test sample comprising: providing an analytic test pack having a reaction chamber, at least one wall of which is of pliable material, and at least one reagent compartment containing reagents and separated from said reaction chamber; introducing the test sample into said reaction chamber; releasing at least one reagent contained in at least one reagent compartment into said reaction chamber, independently of any other reagents in other reagent compartments, whereby any single reagent or combination of reagents may be introduced into said reaction chamber; mixing said test sample and said reagent; and reading out the result of the reaction between said reagent and said test sample.*

*20. The method of claim 19 wherein at least a portion of the walls of said reaction chamber are optically transparent and wherein the step of reading out the result of the reaction between said reagent and said test sample is accomplished by monitoring the optical properties of the reaction mixture by directing electromagnetic radiation through the reaction mixture while it is in the test pack, and generating a signal in response to the transmitted radiation, and processing said signal to produce an analytical result.*

*21. The method of claim 19 wherein the step of releasing reagents into said reaction chamber takes place by first releasing at least one reagent into said reaction chamber, and, then, after a period of time, releasing at least one other reagent into said reaction chamber.*

*22. The method of claim 19 wherein said reaction chamber is divided into two compartments, wherein each of said compartments is conditioned differently, and wherein the step of reading out the reaction between said reagents and said test sample is accomplished differentially.*

*23. The method of analyzing a test sample comprising providing a disposable test pack having a reaction compartment and at least one reagent stored within said test pack but separated from said reaction compartment, at least a portion of the test pack being sufficiently optically transparent so that the test pack can be utilized as an optical cell for optical analysis, the test pack carrying information for identifying and for processing the test pack, adding a measured quantity of a sample to the reaction compartment, adding at least one reagent stored within the disposable container to the reaction compartment to form a reaction mixture, incubating said reaction mixture within said test pack for a period of time sufficient to bring the reaction mixture to the desired state for analysis, and monitoring at least one of the optical properties of said reaction mixture while it is within said test pack by directing electromagnetic radiation through said reaction mixture, and generating a signal in response to the transmitted radiation, and processing said signal to produce an analytical result.*

*24. The method of claim 23 wherein a plurality of stored reagents are added to the reaction compartment.*

*25. The method of claim 23 wherein a plurality of stored reagents are added each at different times to the reaction compartment.*

*26. The method of claim 23 further including mixing the measured quantity of sample after each reagent is added thereto.*

*27. The method of analyzing a test sample comprising providing a disposable test pack having a reaction compartment and a plurality of reagents stored within said test pack but separated from said reaction compartment, at least a portion of test pack being sufficiently optically transparent so that the test pack can be utilized as an optical cell for optical analysis, adding a measured quantity of a sample to the reaction compartment, adding at least one reagent stored within the test pack to the reaction compartment to form a reaction mixture, incubating said reaction mixture within said reaction compartment, adding at least one further reagent stored within the disposable container to the reaction mixture, and monitoring at least one of the optical properties of said reaction mixture while it is within said test pack by directing electromagnetic radiation through said reaction mixture, and generating a signal in response to the transmitted radiation, and processing said signal to produce an analytical result.*

*28. A disposable test pack comprising: a reaction compartment, for the mixing of materials added thereto; a storage section having a plurality of separate reagent storage chambers, said reagent storage chambers being adapted to be charged with predetermined quantities of reagents, each of said reagent storage chambers being further adapted to release said reagents independently of any other reagents present in other reagent storage chambers into said reaction compartment; and means communicating with said reaction compartment for introducing a sample into said reaction compartment.*

*29. A disposable test pack comprising: a reaction compartment for the mixing of materials added thereto; a storage section having a plurality of separate reagent storage chambers, said reagent storage chambers being adapted to be charged with predetermined quantities of reagents, each of said reagent storage chambers being further adapted to release said reagents independently of any other reagents present in other reagent storage chambers into said reaction compartment; and means communicating with said reaction compartment for introducing a sample into said reaction compartment; at least a portion of said test pack being sufficiently optically transparent so that said test pack can be utilized as an optical cell for optical analysis.*

*30. The disposable test pack of claim 30 wherein said test pack comprises a plurality of reaction compartments.*

*31. The disposable test pack of claim 30 wherein at least a portion of said reaction compartment is made from a pliable material.*

*32. The disposable test pack of claim 30 having data stored thereon.*

*33. The disposable test pack of claim 30 wherein said storage section comprises a layer having a plurality of reagent-storing chambers formed therein.*

*34. The method of analyzing a test sample in a disposable test pack having a reaction compartment, at least one reagent stored within said disposable container but separated from said reaction compartment, and at least a portion of said test pack being sufficiently transparent so that the reaction compartment can be utilized as an optical cell for optical analysis, said method comprising adding a measured quantity of a sample to the reaction compartment, adding at least one reagent stored within the test pack to said reaction compartment, and monitoring at least one of the optical properties of said reaction mixture while it is within said test pack, said monitoring including defining an optical path through the reaction mixture in the test pack by cooperation of external optical path-defining means with the sufficiently flexible walls of said test pack and passing a beam of electromagnetic radiation through said reaction mixture along said optical path.*

*35. The method of analyzing a test sample comprising providing a disposable test pack having a reaction compartment and at least one reagent stored within said disposable test pack but separated from said reaction compartment, the test pack carrying information for identifying and for processing the test pack, adding a measured quantity of a sample to the reaction compartment, adding a reagent stored within the test pack to the sample to form a reaction mixture, incubating said reaction mixture within said test pack for a period of time sufficient to bring the reaction mixture to the desired state for analysis, and reading out the result of the reaction between the reagent and the test sample while the reaction mixture is within said test pack.*

* * * * *